(12) United States Patent
Kamath et al.

(10) Patent No.: US 8,797,843 B2
(45) Date of Patent: *Aug. 5, 2014

(54) HIGH AVAILABILITY DISTRIBUTED FABRIC PROTOCOL (DFP) SWITCHING NETWORK ARCHITECTURE

(75) Inventors: Dayavanti G Kamath, Santa Clara, CA (US); Keshav Kamble, Fremont, CA (US); Dar-ren Leu, San Jose, CA (US); Vijoy Pandey, San Jose, CA (US); Nandakumar Peethambaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,405

(22) Filed: Aug. 27, 2012

(65) Prior Publication Data

US 2013/0064067 A1    Mar. 14, 2013

Related U.S. Application Data

(63) Continuation of application No. 13/229,891, filed on Sep. 12, 2011.

(51) Int. Cl.
*H04L 1/00* (2006.01)

(52) U.S. Cl.
USPC .......................................... 370/218; 370/217

(58) Field of Classification Search
USPC ......................................................... 370/218
See application file for complete search history.

(56) References Cited

U.S. PATENT DOCUMENTS

| | | | |
|---|---|---|---|
| 5,394,402 A | 2/1995 | Ross | |
| 5,515,359 A | 5/1996 | Zheng | |

(Continued)

FOREIGN PATENT DOCUMENTS

| | | |
|---|---|---|
| CN | 1897567 | 1/2007 |
| CN | 101030959 A | 9/2007 |
| CN | 101087238 | 12/2007 |
| EP | 0853405 | 7/1998 |

OTHER PUBLICATIONS

U.S. Appl. No. 13/107,894, Non-Final Office Action Dated Jun. 20, 2013.

(Continued)

*Primary Examiner* — Jianye Wu
*Assistant Examiner* — Jeff Banthrongsack
(74) *Attorney, Agent, or Firm* — Yudell Isidore Ng Russell PLLC; Matt Baca

(57) ABSTRACT

In a switching network, each of a plurality of lower tier entities is coupled to each of multiple master switches at an upper tier by a respective one of multiple links. At each of the multiple master switches, a plurality of virtual ports each corresponding to a respective one of a plurality of remote physical interfaces (RPIs) at the lower tier are implemented on each of a plurality of ports. Each of the plurality of lower tier entities implements a respective egress port mapping indicating which of its plurality of RPIs transmits egress data traffic through each of its multiple links to the multiple master switches. In response to failure of one of the multiple links coupling a particular lower tier entity to a particular master switch, the particular lower tier entity updates its egress port mapping to redirect egress data traffic to another of the multiple master switches without packet dropping.

6 Claims, 11 Drawing Sheets

(56) References Cited

U.S. PATENT DOCUMENTS

| | | | |
|---|---|---|---|
| 5,617,421 A | 4/1997 | Chin et al. |
| 5,633,859 A | 5/1997 | Jain et al. |
| 5,633,861 A | 5/1997 | Hanson et al. |
| 5,742,604 A | 4/1998 | Edsall et al. |
| 5,893,320 A | 4/1999 | Demaree |
| 6,147,970 A | 11/2000 | Troxel |
| 6,304,901 B1 | 10/2001 | McCloghrie et al. |
| 6,347,337 B1 | 2/2002 | Shah et al. |
| 6,567,403 B1* | 5/2003 | Congdon et al. ............... 370/389 |
| 6,646,985 B1 | 11/2003 | Park et al. |
| 6,839,768 B2 | 1/2005 | Ma et al. |
| 6,901,452 B1 | 5/2005 | Bertagna |
| 7,035,220 B1 | 4/2006 | Simcoe |
| 7,263,060 B1 | 8/2007 | Garofalo et al. |
| 7,508,763 B2 | 3/2009 | Lee |
| 7,561,517 B2 | 7/2009 | Klinker et al. |
| 7,593,320 B1 | 9/2009 | Cohen et al. |
| 7,668,966 B2 | 2/2010 | Klinker et al. |
| 7,830,793 B2 | 11/2010 | Gai et al. |
| 7,839,777 B2 | 11/2010 | DeCusatis et al. |
| 7,848,226 B2 | 12/2010 | Morita |
| 7,912,003 B2 | 3/2011 | Radunovic et al. |
| 7,974,223 B2 | 7/2011 | Zelig et al. |
| 8,085,657 B2 | 12/2011 | Legg |
| 8,139,358 B2 | 3/2012 | Tambe |
| 8,194,534 B2 | 6/2012 | Pandey et al. |
| 8,204,061 B1 | 6/2012 | Sane et al. |
| 8,213,429 B2 | 7/2012 | Wray et al. |
| 8,265,075 B2 | 9/2012 | Pandey |
| 8,271,680 B2 | 9/2012 | Salkewicz |
| 8,325,598 B2 | 12/2012 | Krzanowski |
| 8,345,697 B2 | 1/2013 | Kotha et al. |
| 8,406,128 B1 | 3/2013 | Brar et al. |
| 8,498,284 B2 | 7/2013 | Pani et al. |
| 8,498,299 B2 | 7/2013 | Katz et al. |
| 8,588,224 B2 | 11/2013 | Kamble et al. |
| 8,594,082 B2 | 11/2013 | Kamble et al. |
| 8,625,427 B1 | 1/2014 | Terry et al. |
| 8,635,614 B2 | 1/2014 | Biswas et al. |
| 8,645,952 B2 | 2/2014 | Biswas et al. |
| 8,670,450 B2 | 3/2014 | Biswas et al. |
| 2002/0191628 A1 | 12/2002 | Liu et al. |
| 2003/0185206 A1 | 10/2003 | Jayakrishnan |
| 2004/0088451 A1 | 5/2004 | Han |
| 2004/0243663 A1 | 12/2004 | Johanson et al. |
| 2004/0255288 A1 | 12/2004 | Hashimoto et al. |
| 2005/0047334 A1 | 3/2005 | Paul et al. |
| 2006/0029072 A1 | 2/2006 | Perera et al. |
| 2006/0251067 A1 | 11/2006 | DeSanti et al. |
| 2007/0036178 A1* | 2/2007 | Hares et al. ................... 370/490 |
| 2007/0263640 A1 | 11/2007 | Finn |
| 2008/0205377 A1 | 8/2008 | Chao et al. |
| 2008/0225712 A1 | 9/2008 | Lange |
| 2008/0228897 A1 | 9/2008 | Ko |
| 2009/0129385 A1 | 5/2009 | Wray et al. |
| 2009/0185571 A1 | 7/2009 | Tallet |
| 2009/0213869 A1 | 8/2009 | Rajendran et al. |
| 2009/0252038 A1 | 10/2009 | Cafiero et al. |
| 2010/0054129 A1 | 3/2010 | Kuik et al. |
| 2010/0054260 A1 | 3/2010 | Pandey et al. |
| 2010/0158024 A1 | 6/2010 | Sajassi et al. |
| 2010/0183011 A1 | 7/2010 | Chao |
| 2010/0223397 A1 | 9/2010 | Elzur |
| 2010/0226368 A1 | 9/2010 | Mack-Crane et al. |
| 2010/0246388 A1 | 9/2010 | Gupta et al. |
| 2010/0257263 A1 | 10/2010 | Casado et al. |
| 2010/0265824 A1 | 10/2010 | Chao et al. |
| 2010/0303075 A1 | 12/2010 | Tripathi et al. |
| 2011/0007746 A1 | 1/2011 | Mudigonda et al. |
| 2011/0019678 A1 | 1/2011 | Mehta et al. |
| 2011/0026403 A1 | 2/2011 | Shao et al. |
| 2011/0026527 A1 | 2/2011 | Shao et al. |
| 2011/0032944 A1 | 2/2011 | Elzur et al. |
| 2011/0035494 A1 | 2/2011 | Pandey et al. |
| 2011/0103389 A1 | 5/2011 | Kidambi et al. |
| 2011/0134793 A1 | 6/2011 | Elsen et al. |
| 2011/0235523 A1 | 9/2011 | Jha et al. |
| 2011/0280572 A1 | 11/2011 | Vobbilisetty et al. |
| 2011/0299406 A1 | 12/2011 | Vobbilisetty et al. |
| 2011/0299409 A1 | 12/2011 | Vobbilisetty et al. |
| 2011/0299532 A1 | 12/2011 | Yu et al. |
| 2011/0299533 A1 | 12/2011 | Yu et al. |
| 2011/0299536 A1 | 12/2011 | Cheng et al. |
| 2012/0014261 A1 | 1/2012 | Salam et al. |
| 2012/0014387 A1 | 1/2012 | Dunbar et al. |
| 2012/0027017 A1 | 2/2012 | Rai et al. |
| 2012/0033541 A1 | 2/2012 | Jacob Da Silva et al. |
| 2012/0117228 A1 | 5/2012 | Gabriel et al. |
| 2012/0131662 A1 | 5/2012 | Kuik et al. |
| 2012/0163164 A1 | 6/2012 | Terry et al. |
| 2012/0177045 A1 | 7/2012 | Berman |
| 2012/0226866 A1 | 9/2012 | Bozek et al. |
| 2012/0228780 A1 | 9/2012 | Kim et al. |
| 2012/0243539 A1 | 9/2012 | Keesara |
| 2012/0243544 A1 | 9/2012 | Keesara |
| 2012/0287786 A1 | 11/2012 | Kamble et al. |
| 2012/0287787 A1 | 11/2012 | Kamble et al. |
| 2012/0287939 A1* | 11/2012 | Leu et al. ...................... 370/409 |
| 2012/0320749 A1 | 12/2012 | Kamble et al. |
| 2013/0022050 A1 | 1/2013 | Leu et al. |
| 2013/0051235 A1 | 2/2013 | Song et al. |
| 2013/0064067 A1 | 3/2013 | Kamath et al. |
| 2013/0064068 A1 | 3/2013 | Kamath et al. |

OTHER PUBLICATIONS

U.S. Appl. No. 13/594,970, Final Office Action Dated Sep. 25, 2013.
U.S. Appl. No. 13/594,970, Non-Final Office Action Dated May 29, 2013.
U.S. Appl. No. 13/107,397, Final Office Action Dated May 29, 2013.
U.S. Appl. No. 13/107,397, Non-Final Office Action Dated Jan. 4, 2013.
U.S. Appl. No. 13/466,754, Non-Final Office Action Dated Sep. 25, 2013.
U.S. Appl. No. 13/229,867, Non-Final Office Action Dated May 24, 2013.
U.S. Appl. No. 13/595,047, Non-Final Office Action Dated May 24, 2013.
U.S. Appl. No. 13/107,985, Notice of Allowance Dated Jul. 18, 2013.
U.S. Appl. No. 13/107,985, Non-Final Office Action Dated Feb. 28, 2013.
U.S. Appl. No. 13/107,433, Final Office Action Dated Jul. 10, 2013.
U.S. Appl. No. 13/107,433, Non-Final Office Action Dated Jan. 28, 2013.
U.S. Appl. No. 13/466,790, Final Office Action Dated Jul. 12, 2013.
U.S. Appl. No. 13/466,790, Non-Final Office Action Dated Feb. 15, 2013.
U.S. Appl. No. 13/107,554, Final Office Action Dated Jul. 3, 2013.
U.S. Appl. No. 13/107,554, Non-Final Office Action Dated Jan. 8, 2013.
U.S. Appl. No. 13/229,891, Non-Final Office Action Dated May 9, 2013.
U.S. Appl. No. 13/595,405, Non-Final Office Action Dated May 9, 2013.
U.S. Appl. No. 13/107,896, Notice of Allowance Dated Jul. 29, 2013.
U.S. Appl. No. 13/107,896, Non-Final Office Action Dated Mar. 7, 2013.
U.S. Appl. No. 13/267,459, Non-Final Office Action Dated May 2, 2013.
U.S. Appl. No. 13/267,578, Non-Final Office Action Dated Aug. 6, 2013.
U.S. Appl. No. 13/267,578, Non-Final Office Action Dated Apr. 5, 2013.
U.S. Appl. No. 13/314,455, Final Office Action Dated Aug. 30, 2013.
U.S. Appl. No. 13/314,455, Non-Final Office Action Dated Apr. 24, 2013.
U.S. Appl. No. 13/585,445, Final Office Action Dated Jun. 19, 2013.
U.S. Appl. No. 13/585,445, Notice of Allowance Dated Sep. 12, 2013.

(56) References Cited

OTHER PUBLICATIONS

U.S. Appl. No. 13/585,445, Non-Final Office Action Dated Feb. 26, 2013.
U.S. Appl. No. 13/621,219, Non-final office action dated Nov. 26, 2013.
U.S. Appl. No. 13/107,554 Notice of Allowance dated Oct. 18, 2013.
U.S. Appl. No. 13/267,459 Final office action dated Oct. 23, 2013.
U.S. Appl. No. 13/594,993 Non-final office action dated Oct. 25, 2013.
U.S. Appl. No. 13/594,970 Final Office action dated Dec. 4, 2013.
U.S. Appl. No. 13/315,463 Notice of Allowance dated Jan. 27, 2014.
U.S. Appl. No. 13/315,463 Notice of Allowance dated Feb. 19, 2014.
U.S. Appl. No. 13/594,993 Notice of Allowance dated Feb. 19, 2014.
U.S. Appl. No. 13/107,894 Notice of Allowance dated Feb. 19, 2014.
U.S. Appl. No. 13/267,578 Notice of Allowance dated Jan. 24, 2014.
U.S. Appl. No. 13/655,975 Notice of Allowance dated Feb. 19, 2014.
Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.
Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.
Kandula, et al., "Dynamic Load Balancing Without Packet Reordering", ACM SIGCOMM Computer Communication Review, vol. 37, No. 2, pp. 53-62, Apr. 2007.
Vazhkudai, et al., "Enabling the Co-Allocation of Grid Data Transfers", Department of Computer and Information Sciences, The Univ. of Mississippi, pp. 44-51, Nov. 17, 2003.
Xiao, et al. "Internet QoS: A Big Picture", Michigan State University, IEEE Network, pp. 8-18, Mar./Apr. 1999.
Jo et al., "Internet Traffic Load Balancing using Dynamic Hashing with Flow Volume", Conference Title: Internet Performance and Control of Network Systems III, Boston, MA pp. 1-12, Jul. 30, 2002.
Schueler et al., "TCP-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996.
Schlansker, et al., "High-Performance Ethernet-Based Communications for Future Multi-Core Processors", Proceedings of the 2007 ACM/IEEE conference on Supercomputing, Nov. 10-16, 2007.
Yoshigoe, et al., "Rate Control for Bandwidth Allocated Services in IEEE 802.3 Ethernet", Proceedings of the 26th Annual IEEE Conference on Local Computer Networks, Nov. 14-16, 2001.
Tolmie, "HIPPI-6400—Designing for speed", 12th Annual Int'l Symposium on High Performance Computing Systems and Applications (HPCSt98), May 20-22, 1998.
Manral, et al., "Rbridges: Bidirectional Forwarding Detection (BFD) support for TRILL draft-manral-trill-bfd-encaps-01", pp. 1-10, TRILL Working Group Internet-Draft, Mar. 13, 2011.
Perlman, et al., "Rbridges: Base Protocol Specification", pp. 1-117, TRILL Working Group Internet-Draft, Mar. 3, 2010.
D.E. Eastlake, "Rbridges and the IETF TRILL Protocol", pp. 1-39, TRILL Protocol, Dec. 2009.
Leu, Dar-Ren, "dLAG-DMLT over TRILL", BLADE Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205.
Cisco Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets-VIII), New York City, New York,.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul. 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)—Issue Date: 2002, Date of Current Version: Jan. 6, 2003.
Papadopoulos et al.,"NPACI Rocks: Tools and Techniques for Easily Deploying Manageable Linux Clusters", The San Diego Supercomputer Center, University of California San Diego, La Jolla, CA 92093-0505—Issue Date: 2001, Date of Current Version: Aug. 7, 2002.
Ruth et al., Virtual Distributed Environments in a Shared Infrastructure, pp. 63-69, IEEE Computer Society, May 2005.
"Rouiller, Virtual LAN Security: weaknesses and countermeasures, pp. 1-49, GIAC Security Essentials Practical Assignment Version 1.4b".
Walters et al., An Adaptive Heterogeneous Software DSM, pp. 1-8, Columbus, Ohio, Aug. 14-Aug. 18.
Skyrme et al., Exploring Lua for Concurrent Programming, pp. 3556-3572, Journal of Universal Computer Science, vol. 14, No. 21 (2008), submitted: Apr. 16, 2008, accepted: Jun. 5, 2008, appeared: Dec. 1, 2008.
Dobre, Multi-Architecture Operating Systems, pp. 1-82, Oct. 4, 2004.
Int'l Searching Authority; Int. Appln. PCT/IB2012/051803; Int'l Search Report dated Sep. 13, 2012 (7 pg.).
U.S. Appl. No. 13/107,893, Notice of Allowance Dated Jul. 10, 2013.
U.S. Appl. No. 13/107,893, Non-Final Office Action Dated Apr. 1, 2013.
U.S. Appl. No. 13/472,964, Notice of Allowance Dated Jul. 12, 2013.
U.S. Appl. No. 13/472,964, Non-Final Office Action Dated Mar. 29, 2013.
U.S. Appl. No. 13/107,903, Notice of Allowance Dated Sep. 11, 2013.
U.S. Appl. No. 13/107,903, Final Office Action Dated Jul. 19, 2013.
U.S. Appl. No. 13/107,903, Non-Final Office Action Dated Feb. 22, 2013.
U.S. Appl. No. 13/585,446, Notice of Allowance Dated.
U.S. Appl. No. 13/585,446, Final Office Action Dated Jul. 19, 2013.
U.S. Appl. No. 13/585,446, Non-Final Office Action Dated Feb. 16, 2013.

\* cited by examiner

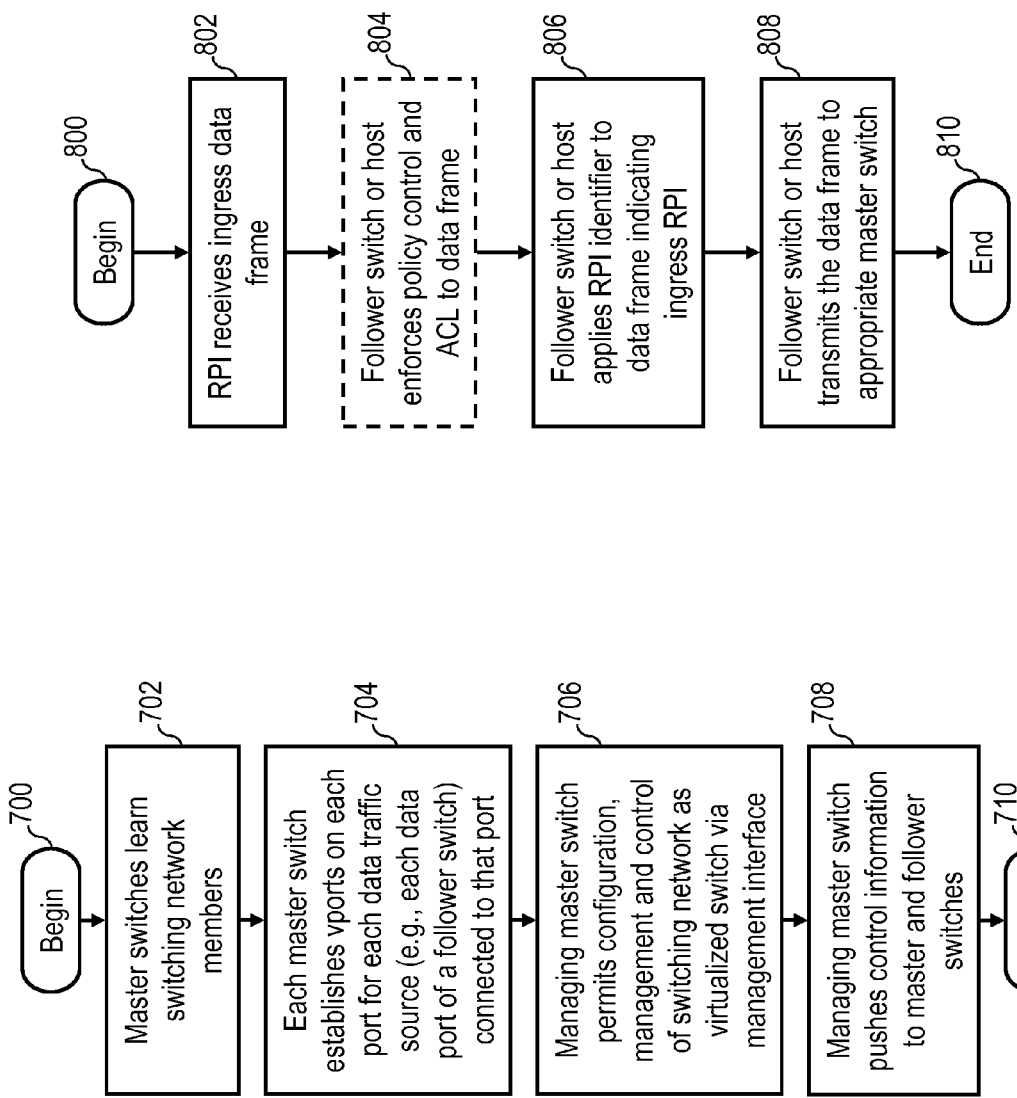

HIGH AVAILABILITY DISTRIBUTED FABRIC PROTOCOL (DFP) SWITCHING NETWORK ARCHITECTURE

This application is a continuation of U.S. patent application Ser. No. 13/229,891 entitled "HIGH AVAILABILITY DISTRIBUTED FABRIC PROTOCOL (DFP) SWITCHING NETWORK ARCHITECTURE," by Dayavanti G. Kamath et al., filed on Sep. 12, 2011, the disclosure of which is incorporated herein by reference in its entirety for all purposes.

BACKGROUND OF THE INVENTION

1. Technical Field

The present invention relates in general to network communication and, in particular, to an improved switching network architecture for computer networks.

2. Description of the Related Art

As is known in the art, network communication is commonly premised on the well known seven layer Open Systems Interconnection (OSI) model, which defines the functions of various protocol layers while not specifying the layer protocols themselves. The seven layers, sometimes referred to herein as Layer 7 through Layer 1, are the application, presentation, session, transport, network, data link, and physical layers, respectively.

At a source station, data communication begins when data is received from a source process at the top (application) layer of the stack of functions. The data is sequentially formatted at each successively lower layer of the stack until a data frame of bits is obtained at the data link layer. Finally, at the physical layer, the data is transmitted in the form of electromagnetic signals toward a destination station via a network link. When received at the destination station, the transmitted data is passed up a corresponding stack of functions in the reverse order in which the data was processed at the source station, thus supplying the information to a receiving process at the destination station.

The principle of layered protocols, such as those supported by the OSI model, is that, while data traverses the model layers vertically, the layers at the source and destination stations interact in a peer-to-peer (i.e., Layer N to Layer N) manner, and the functions of each individual layer are performed without affecting the interface between the function of the individual layer and the protocol layers immediately above and below it. To achieve this effect, each layer of the protocol stack in the source station typically adds information (in the form of an encapsulated header) to the data generated by the sending process as the data descends the stack. At the destination station, these encapsulated headers are stripped off one-by-one as the data propagates up the layers of the stack until the decapsulated data is delivered to the receiving process.

The physical network coupling the source and destination stations may include any number of network nodes interconnected by one or more wired or wireless network links. The network nodes commonly include hosts (e.g., server computers, client computers, mobile devices, etc.) that produce and consume network traffic, switches, and routers. Conventional network switches interconnect different network segments and process and forward data at the data link layer (Layer 2) of the OSI model. Switches typically provide at least basic bridge functions, including filtering data traffic by Layer 2 Media Access Control (MAC) address, learning the source MAC addresses of frames, and forwarding frames based upon destination MAC addresses. Routers, which interconnect different networks at the network (Layer 3) of the OSI model, typically implement network services such as route processing, path determination and path switching.

A large network typically includes a large number of switches, which operate independently at the management, control and data planes. Consequently, each switch must be individually configured, implements independent control on data traffic (e.g., access control lists (ACLs)), and forwards data traffic independently of data traffic handled by any other of the switches.

SUMMARY OF THE INVENTION

In accordance with at least one embodiment, the management, control and data handling of a plurality of switches in a computer network is improved.

In at least one embodiment, a switching network includes an upper tier including a master switch and a lower tier including a plurality of lower tier entities. The master switch includes a plurality of ports each coupled to a respective one of the plurality of lower tier entities. Each of the plurality of ports includes a plurality of virtual ports each corresponding to a respective one of a plurality of remote physical interfaces (RPIs) at the lower tier entity coupled to that port. Each of the plurality of ports also includes a receive interface that, responsive to receipt of data traffic from a particular lower tier entity among the plurality of lower tier entities, queues the data traffic to the virtual port among the plurality of virtual ports that corresponds to the RPI on the particular lower tier entity that was the source of the data traffic. The master switch further includes a switch controller that switches data traffic from the virtual port to an egress port among the plurality of ports from which the data traffic is forwarded.

In at least some embodiment of a switching network, each of a plurality of lower tier entities is coupled to each of multiple master switches at an upper tier by a respective one of multiple links. At each of the multiple master switches, a plurality of virtual ports each corresponding to a respective one of a plurality of remote physical interfaces (RPIs) at the lower tier are implemented on each of a plurality of ports. Each of the plurality of lower tier entities implements a respective egress port mapping indicating which of its plurality of RPIs transmits egress data traffic through each of its multiple links to the multiple master switches. In response to failure of one of the multiple links coupling a particular lower tier entity to a particular master switch, the particular lower tier entity updates its egress port mapping to redirect egress data traffic to another of the multiple master switches without packet dropping.

BRIEF DESCRIPTION OF THE DRAWINGS

FIG. 7 is a high level logical flowchart of an exemplary process for managing a DFP switching network in accordance with one embodiment;

FIG. 8 is depicted a high level logical flowchart of an exemplary process by which network traffic is forwarded from a lower tier to an upper tier of a DFP switching network configured to operate as a virtualized switch in accordance with one embodiment;

DETAILED DESCRIPTION OF ILLUSTRATIVE EMBODIMENT

Disclosed herein is a switching network architecture that imposes unified management, control and data planes on a plurality of interconnected switches in a computer network.

Figure 1:
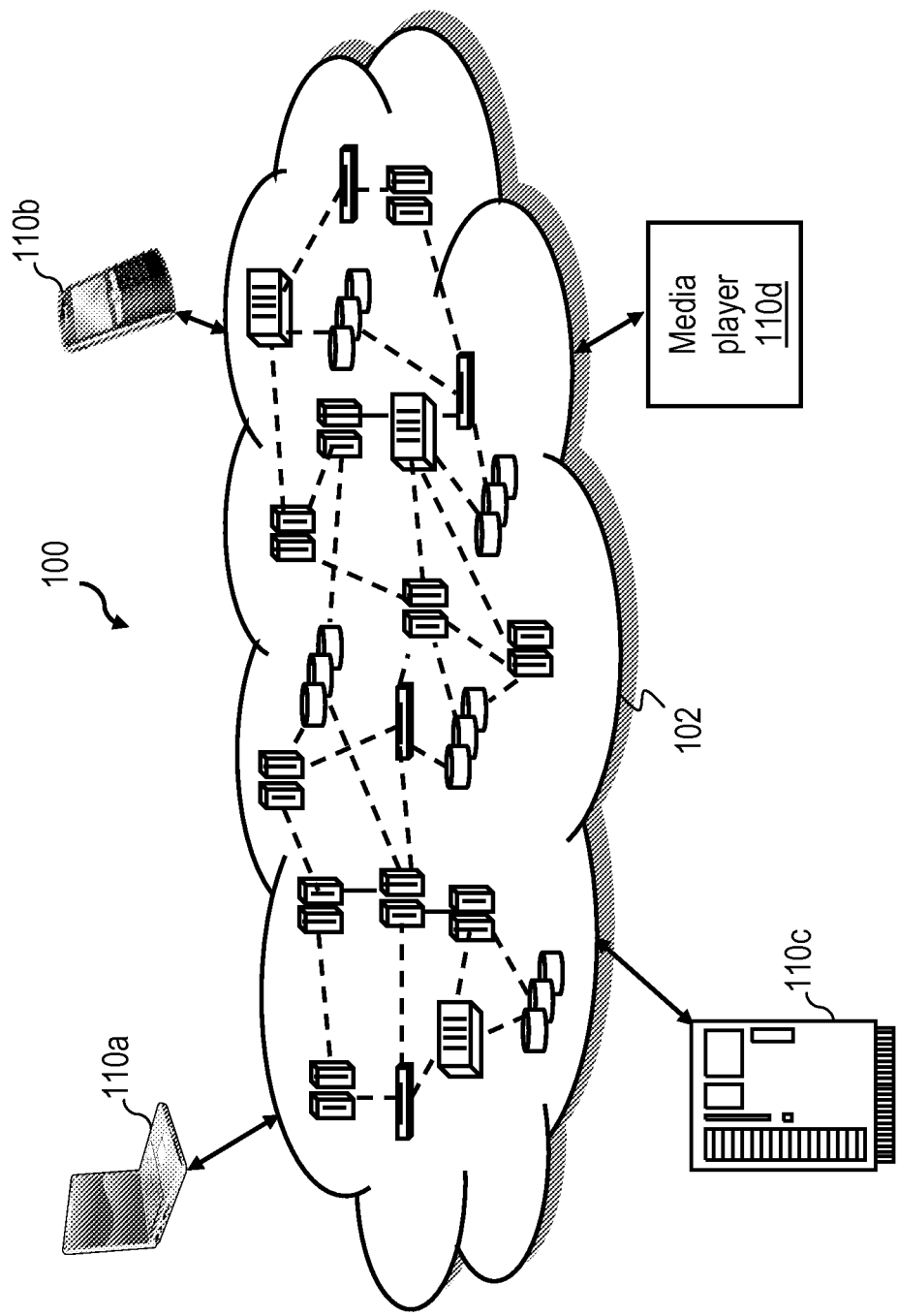
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing resources 102 via a packet network.

Figure 2:
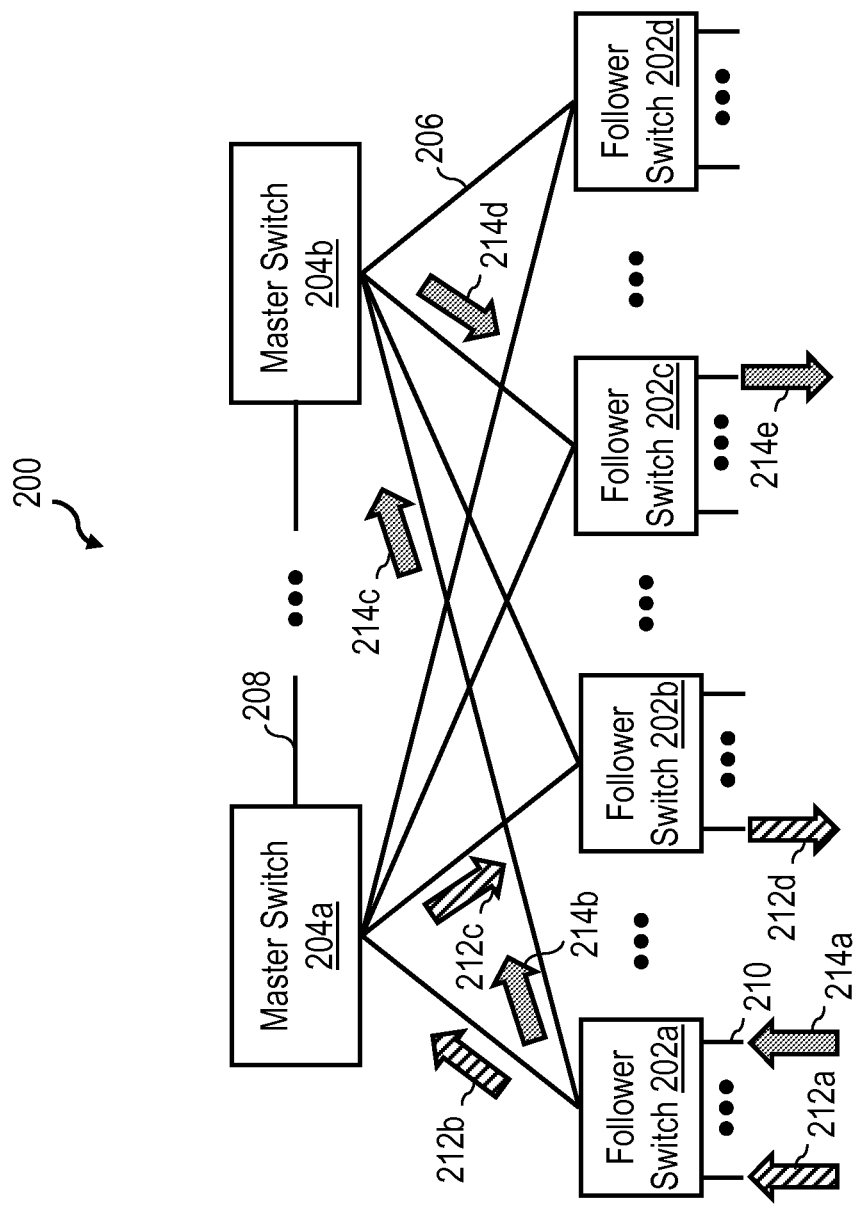
FIG. 2 is a high level block diagram of one embodiment of a distributed fabric protocol (DFP) switching network architecture that can be implemented within the data processing environment of FIG. 1.

Referring now to FIG. 2, there is illustrated a high level block diagram of an exemplary distributed fabric protocol (DFP) switching network architecture that may be implemented within resources 102 in accordance with one embodiment. In the illustrated exemplary embodiment, resources 102 include a plurality of physical and/or virtual network switches forming a DFP switching network 200. In contrast to conventional network environments in which each switch implements independent management, control and data planes, DFP switching network 200 implements unified management, control and data planes, enabling all the constituent switches to be viewed as a unified virtualized switch, thus simplifying deployment, configuration, and management of the network fabric.

DFP switching network 200 includes two or more tiers of switches, which in the instant embodiment includes a lower tier having a plurality of follower switches, including follower switches 202a-202d, and an upper tier having a plurality of master switches, including master switches 204a-204b. In an embodiment with two tiers as shown, a port of each master switch 204 is directly connected by one of inter-tier links 206 to one of the ports of each follower switch 202, and a port of each master switch 204 is coupled directly or indirectly to a port at least one other master switch 204 by a master link 208. When such distinctions are relevant, ports supporting switch-to-switch communication via inter-tier links 206 are referred to herein as "inter-switch ports," and other ports (e.g., of follower switch 202a-202d) are referred to as "data ports."

In a preferred embodiment, follower switches 202 are configured to operate on the data plane in a pass-through mode, meaning that all ingress data traffic received at data ports 210 of follower switches 202 (e.g., from hosts) is forwarded by follower switches 202 via inter-switch ports and inter-tier links 206 to one of master switches 204. Master switches 204 in turn serve as the fabric for the data traffic (hence the notion of a distributed fabric) and implement all packet switching and routing for the data traffic. With this arrangement data traffic may be forwarded, for example, in the first exemplary flow indicated by arrows 212a-212d and the second exemplary flow indicated by arrows 214a-214e.

As will be appreciated, the centralization of switching and routing for follower switches 202 in master switches 204 implies that master switches 204 have knowledge of the ingress data ports of follower switches 202 on which data traffic was received. In a preferred embodiment, each follower switch 202 preferably implements a port mapping s-VLAN component as defined in IEEE 802.1Qbc, which adds an s-tag (service tag) to frames flowing to master switches 204 to communicate the frames' ingress data ports 210 on the follower switch 202 to the master switches 204. In alternative embodiments, the ingress data port can be communicated by another identifier, for example, a MAC-in-MAC header, a unique MAC address, an IP-in-IP header, etc. As discussed further below, each data port 210 on each follower switch 202 has a corresponding virtual port (or vport) on each master switch 204, and data frames ingressing on the data port 210 of a follower switch 202 are handled as if ingressing on the corresponding vport of the recipient master switch 204.

Figure 3:
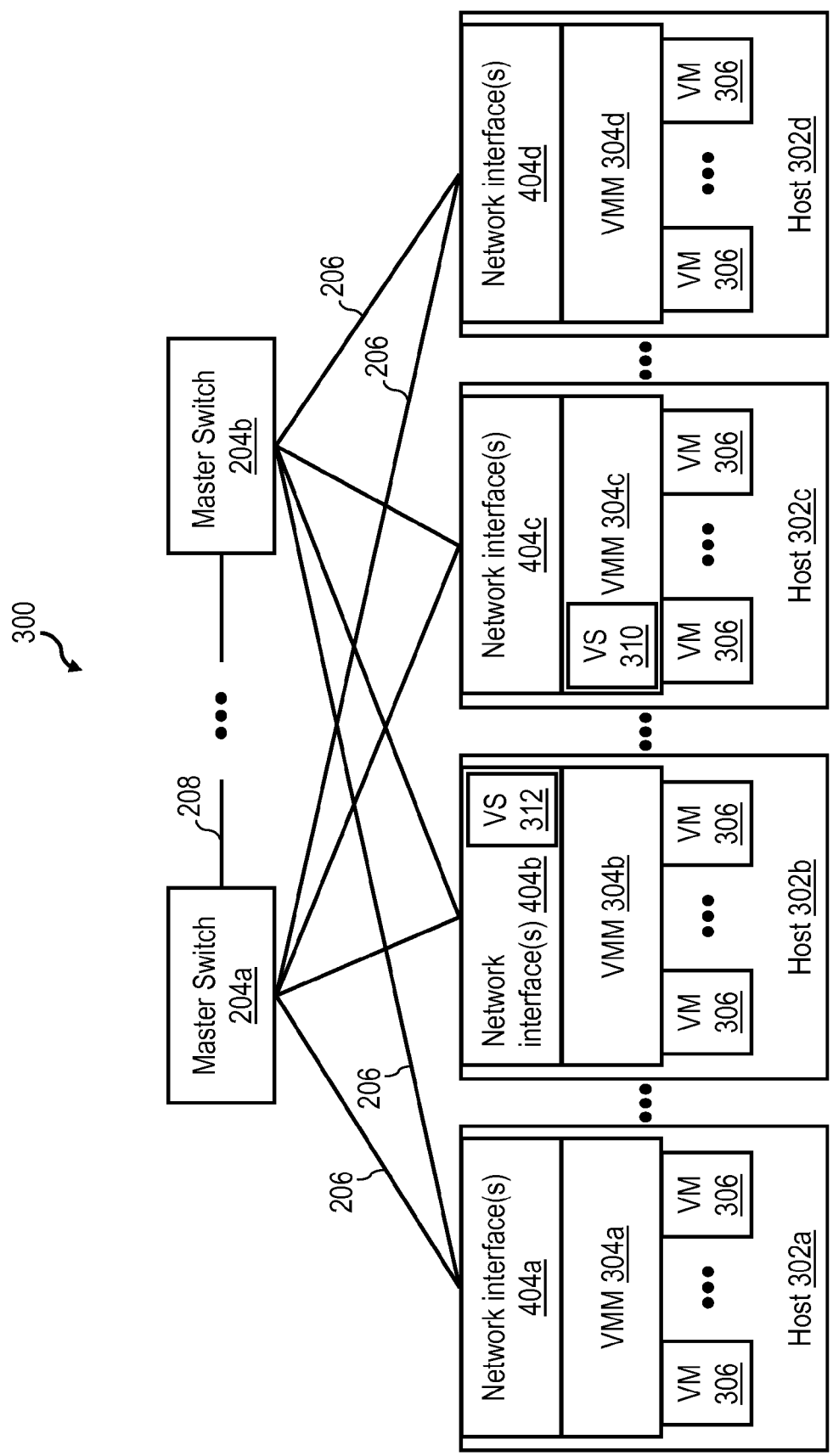
FIG. 3 is a high level block diagram of another embodiment of a DFP switching network architecture that can be implemented within the data processing environment of FIG. 1.

With reference now to FIG. 3, there is illustrated an a high level block diagram of another exemplary distributed fabric protocol (DFP) switching network architecture that may be implemented within resources 102 in accordance with one embodiment. The DFP architecture shown in FIG. 3, which implements unified management, control and data planes across a DFP switching network 300, may be implemented within resources 102 as an alternative to or in addition to DFP switching network architecture depicted in FIG. 2.

Figure 4:
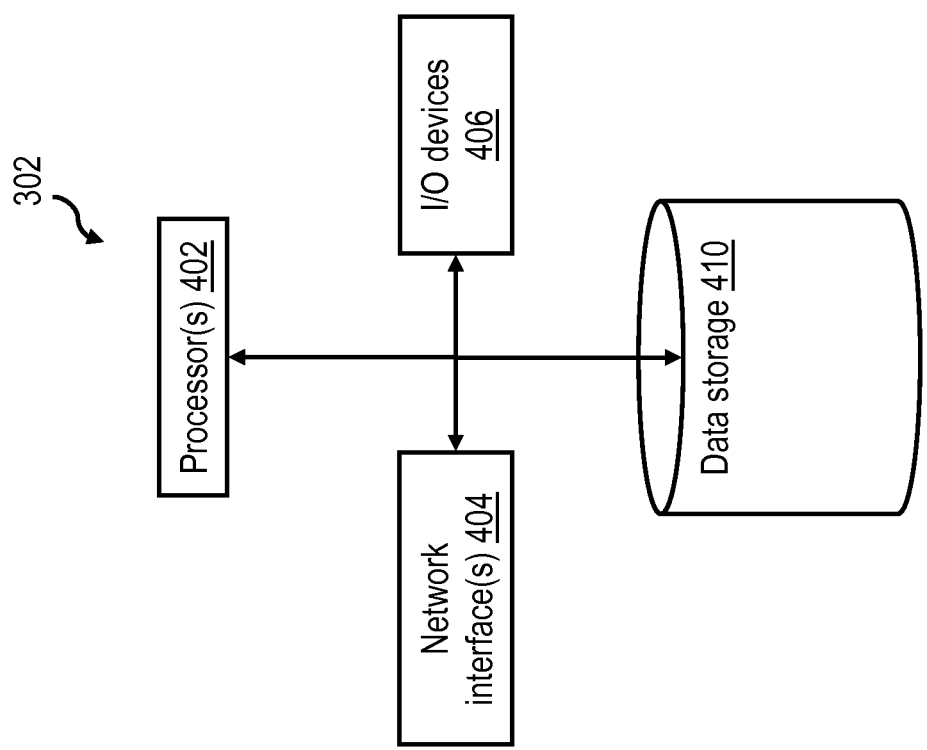
FIG. 4 is a more detailed block diagram of a host in FIG. 3 in accordance with one embodiment.

In the illustrated exemplary embodiment, the resources 102 within DFP switching network 300 include one or more physical and/or virtual network switches implementing at least one of master switches 204a-204b in an upper tier. Switching network 300 additionally includes at a lower tier a plurality of physical hosts 302a-302d. As depicted in FIG. 4, in an exemplary embodiment, each host 302 includes one or more network interfaces 404 (e.g., network interface cards (NICs), converged network adapters (CNAs), etc.) that provides an interface by which that host 302 communicates with master switch(es) 204. Host 302 additionally includes one or more processors 402 (typically comprising one or more integrated circuits) that process data and program code, for example, to manage, access and manipulate data or software in data processing environment 100. Host 302 also includes input/output (I/O) devices 406, such as ports, displays, user input devices and attached devices, etc., which receive inputs and provide outputs of the processing performed by host 302 and/or other resource(s) in data processing environment 100. Finally, host 302 includes data storage 410, which may include one or more volatile or non-volatile storage devices, including memories, solid state drives, optical or magnetic disk drives, tape drives, etc. Data storage 410 may store, for example, program code (including software, firmware or a combination thereof) and data.

Returning to FIG. 3, the program code executed by each host 302 includes a virtual machine monitor (VMM) 304 (also referred to as a hypervisor) which virtualizes and manages the resources of its respective physical host 302. Each VMM 304 allocates resources to, and supports the execution of one or more virtual machines (VMs) 306 in one or more possibly heterogeneous operating system partitions. Each of VMs 304 may have one (and in some cases multiple) virtual network interfaces (virtual NICs (VNICs)) providing network connectivity at least at Layers 2 and 3 of the OSI model.

As depicted, one or more of VMMs 304a-304d may optionally provide one or more virtual switches (VSs) 310 (e.g., Fibre Channel switch(es), Ethernet switch(es), Fibre Channel over Ethernet (FCoE) switches, etc.) to which VMs 306 can attach. Similarly, one or more of the network interfaces 404 of hosts 302 may optionally provide one or more virtual switches (VSs) 312 (e.g., Fibre Channel switch(es), Ethernet switch(es), FCoE switches, etc.) to which VMs 306 may connect. Thus, VMs 306 are in network communication with master switch(es) 204 via inter-tier links 206, network interfaces 404, the virtualization layer provided by VMMs 304, and optionally, one or more virtual switches 310, 312 implemented in program code and/or hardware.

As in FIG. 2, virtual switches 310, 312, if present, are preferably configured to operate on the data plane in a pass-through mode, meaning that all ingress data traffic received from VMs 306 at the virtual data ports of virtual switches 310, 312 is forwarded by virtual switches 310, 312 via network interfaces 404 and inter-tier links 206 to one of master switches 204. Master switches 204 in turn serve as the fabric for the data traffic and implement all switching and routing for the data traffic.

As discussed above, the centralization of switching and routing for hosts 302 in master switch(es) 204 implies that the master switch 204 receiving data traffic from a host 302 has knowledge of the source of the data traffic (e.g., link aggregation group (LAG) interface, physical port, virtual port, etc.). Again, to permit communication of such traffic source information, each host 302 preferably implements a port mapping s-VLAN component as defined in IEEE 802.1Qbc, which adds an s-tag to frames flowing to master switches 204 to communicate to the recipient master switch 204 the data traffic source (e.g., physical port, LAG interface, virtual port (e.g., VM virtual network interface card (VNIC), Single Root I/O Virtualization (SR-IOV) NIC partition, or FCoE port), etc.) from which the data frame was received. Each such data traffic source has a corresponding vport on each master switch 204, and data frames originating at a data traffic source on a host 302 are handled as if ingressing on the corresponding vport of the recipient master switch 204. For generality, data traffic sources on hosts 302 and data ports 210 on follower switches 202 will hereafter be referred to as remote physical interfaces (RPIs) unless some distinction is intended between the various types of RPIs.

In DFP switching networks 200 and 300, load balancing can be achieved through configuration of follower switches 202 and/or hosts 302. For example, in one possible embodiment of a static configuration, data traffic can be divided between master switches 204 based on the source RPI. In this exemplary embodiment, if two master switches 204 are deployed, each follower switch 202 or host 302 can be configured to implement two static RPI groups each containing half of the total number of its RPIs and then transmit traffic of each of the RPI groups to a different one of the two master switches 204. Similarly, if four master switches 204 are deployed, each follower switch 202 or host 302 can be configured to implement four static RPI groups each containing one-fourth of the total number of its RPIs and then transmit traffic of each of the RPI groups to a different one of the four master switches 204.

Figure 5A:
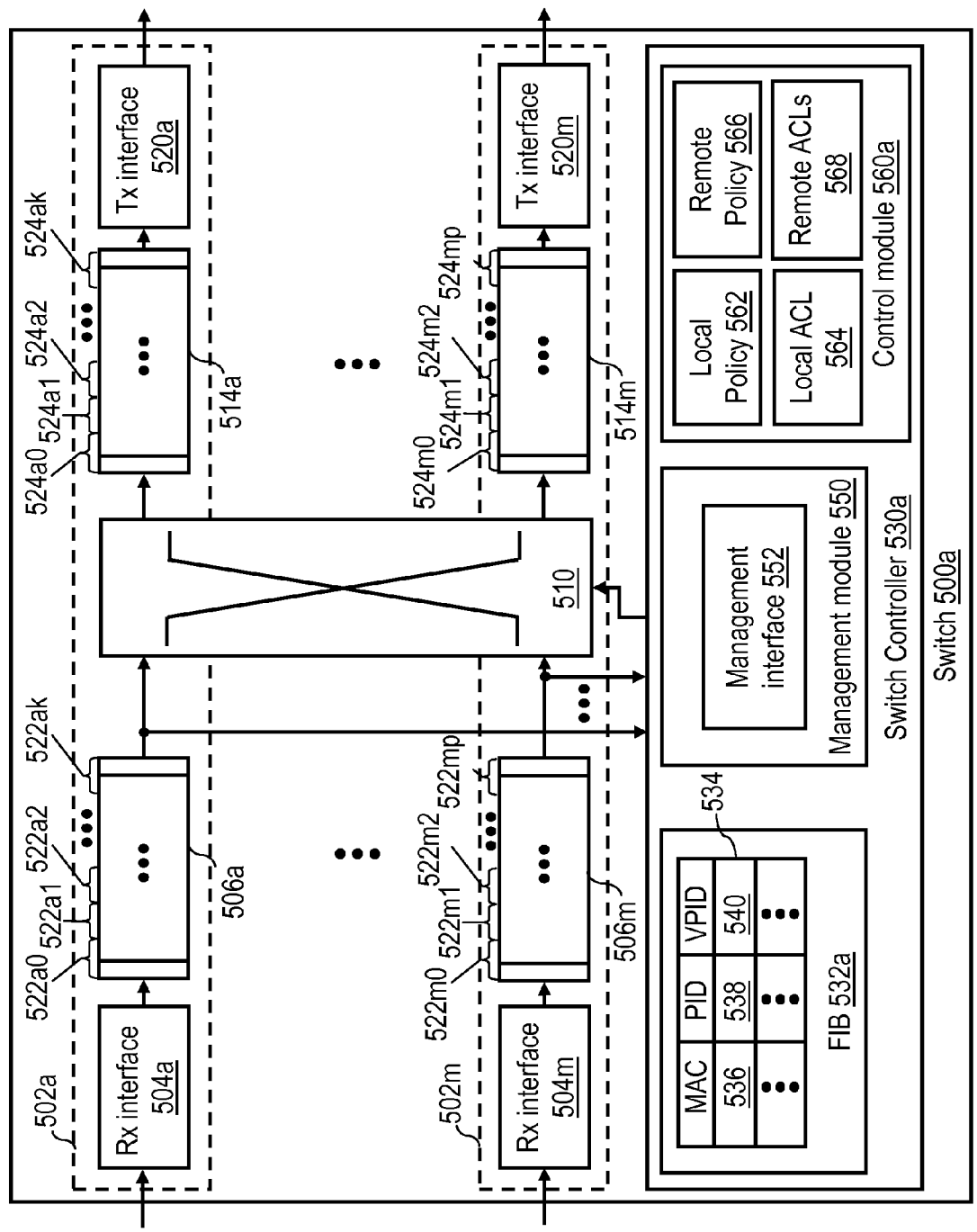
FIG. 5A is a high level block diagram of an exemplary embodiment of a master switch of a DFP switching network in accordance with one embodiment.

With reference now to FIG. 5A, there is illustrated a high level block diagram of an exemplary embodiment of a switch 500a, which may be utilized to implement any of the master switches 204 of FIGS. 2-3.

As shown, switch 500a includes a plurality of physical ports 502a-502m. Each port 502 includes a respective one of a plurality of receive (Rx) interfaces 504a-504m and a respective one of a plurality of ingress queues 506a-506m that buffers data frames received by the associated Rx interface 504. Each of ports 502a-502m further includes a respective one of a plurality of egress queues 514a-514m and a respective one of a plurality of transmit (Tx) interfaces 520a-520m that transmit data frames from an associated egress queue 514.

In one embodiment, each of the ingress queues 506 and egress queues 514 of each port 502 is configured to provide multiple (e.g., eight) queue entries per RPI in the lower tier of the DFP switching network 200, 300 from which ingress data traffic can be received on that port 502. The group of multiple queue entries within a master switch 204 defined for a lower tier RPI is defined herein as a virtual port (vport), with each queue entry in the vport corresponding to a VOQ. For example, for a DFP switching network 200 as depicted in FIG. 2, port 502a of switch 500a is configured to implement, for each of k+1 data ports 210 of the follower switch 202 connected to port 502a, a respective one of ingress vports 522a0-522ak and a respective one of egress vports 524a0-524ak. If switch 500a is implemented in a DFP switching network 300 as illustrated in FIG. 3, port 502a is configured to implement a respective vport 522 for each of k+1 data traffic sources in the host 302 connected to port 502a by an inter-tier link 206. Similarly, for a DFP switching network 200 as depicted in FIG. 2, port 502m of switch 500a is configured to implement, for each of p+1 data ports 210 of a follower switch 202 connected to port 502m, a respective one of ingress vports 522m0-522mp and a respective one of egress vports 524m0-524mp. If switch 500a is implemented in a DFP switching network 300 as illustrated in FIG. 3, port 502a implements a respective vport 522 for each of k data traffic sources in the host 302 connected to port 502a by an inter-tier link 206. As will be appreciated the number of ingress vports implemented on each of ports 502 may differ depending upon the number of RPIs on the particular lower tier entity (e.g., follower switch 202 or host 302) connected to each of ports 502. Thus, each RPI at the lower tier of a DFP switching network 200 or 300 is mapped to a set of ingress and egress vports 522, 524 on a physical port 502 of each master switch 204, and when data frames from that RPI are received on the physical port 502, the receive interface 504 of port 502 can direct the data frames to the appropriate ingress vport 522 based on an RPI identifier in the data traffic.

Master switch 204 can create, destroy, disable or migrate vports 522, 524 across its physical ports 502 as needed depending, for example, on the connection state with the lower tier entities 202, 302. For example, if a follower switch 202 is replaced by a replacement follower switch 202 with a greater number of ports, master switches 204 will automatically create additional vports 522, 524 on the relevant physical port 502 in order to accommodate the additional RPIs on the replacement follower switch 202. Similarly, if a VM 306 running on a host 302 connected to a first physical port of a master switch 204 migrates to a different host 302 connected to a different second physical port of the master switch 204 (i.e., the migration remains within the switch domain), the master switch 204 will automatically migrate the vports 522, 524 corresponding to the VM 306 from the first physical port 502 of the master switch 204 to the second physical port 502 of the master switch 204. If the VM 306 completes its migration within a predetermined flush interval, data traffic for the VM 306 can be remarked by switch controller 530a and forwarded to the egress vport 524 on the second physical port 502. In this manner, the migration of the VM 306 can be accomplished without traffic interruption or loss of data traffic, which is particularly advantageous for loss-sensitive protocols.

Each master switch 204 additionally detects loss of an inter-switch link 206 to a lower tier entity (e.g., the link state changes from up to down, inter-switch link 206 is disconnected, or lower tier entity fails). If loss of an inter-switch link 206 is detected, the master switch 204 will automatically disable the associated vports 522, 524 until restoration of the inter-switch link 206 is detected. If the inter-switch link 206 is not restored within a predetermined flush interval, master switch 204 will destroy the vports 522, 524 associated with the lower tier entity with which communication has been lost in order to recover the queue capacity. During the flush interval, switch controller 530a permits data traffic destined for a disabled egress vport 524 to be buffered on the ingress side. If the inter-switch link 206 is restored and the disabled egress vport 524 is re-enabled, the buffered data traffic can be forwarded to the egress vport 524 within loss.

Switch 500a additionally includes a switch fabric 510, such as a crossbar or shared memory switch fabric, that is operable to intelligently switch data frames from any of ingress queues 506a-506m to any of egress queues 514a-514m (and thus between any ingress vport 522 and any egress vport 524) under the direction of switch controller 530a. As will be appreciated, switch controller 530a can be implemented with one or more centralized or distributed, special-purpose or general-purpose processing elements or logic devices, which may implement control entirely in hardware, or more commonly, through the execution of firmware and/or software by a processing element.

In order to intelligently switch data frames, switch controller 530a builds and maintains one or more data plane data structures, for example, a forwarding information base (FIB) 532a, which is commonly implemented as a forwarding table in content-addressable memory (CAM). In the depicted example, FIB 532a includes a plurality of entries 534, which may include, for example, a MAC field 536, a port identifier (PID) field 538 and a virtual port (vport) identifier (VPID) field 540. Each entry 534 thus associates a destination MAC address of a data frame with a particular vport 520 on a particular egress port 502 for the data frame. Switch controller 530a builds FIB 332a in an automated manner by learning from observed data frames an association between ports 502 and vports 520 and destination MAC addresses specified by the data frames and recording the learned associations in FIB 532a. Switch controller 530a thereafter controls switch fabric 510 to switch data frames in accordance with the associations recorded in FIB 532a. Thus, each master switch 204 manages and accesses its Layer 2 and Layer 3 QoS, ACL and other management data structures per vport corresponding to RPIs at the lower tier.

Switch controller 530a additionally implements a management module 550 that serves as the management and control center for the unified virtualized switch. In one embodiment, each master switch 204 includes management module 350, but the management module 350 of only a single master switch 204 (referred to herein as the managing master switch 204) of a given DFP switching network 200 or 300 is operative at any one time. In the event of a failure of the master switch 204 then serving as the managing master switch 204 (e.g., as detected by the loss of heartbeat messaging by the managing master switch 204 via a master link 208), another master switch 204, which may be predetermined or elected from among the remaining operative master switches 204, preferably automatically assumes the role of the managing master switch 204 and utilizes its management module 350 to provide centralized management and control of the DFP switching network 200 or 300.

Figure 6:
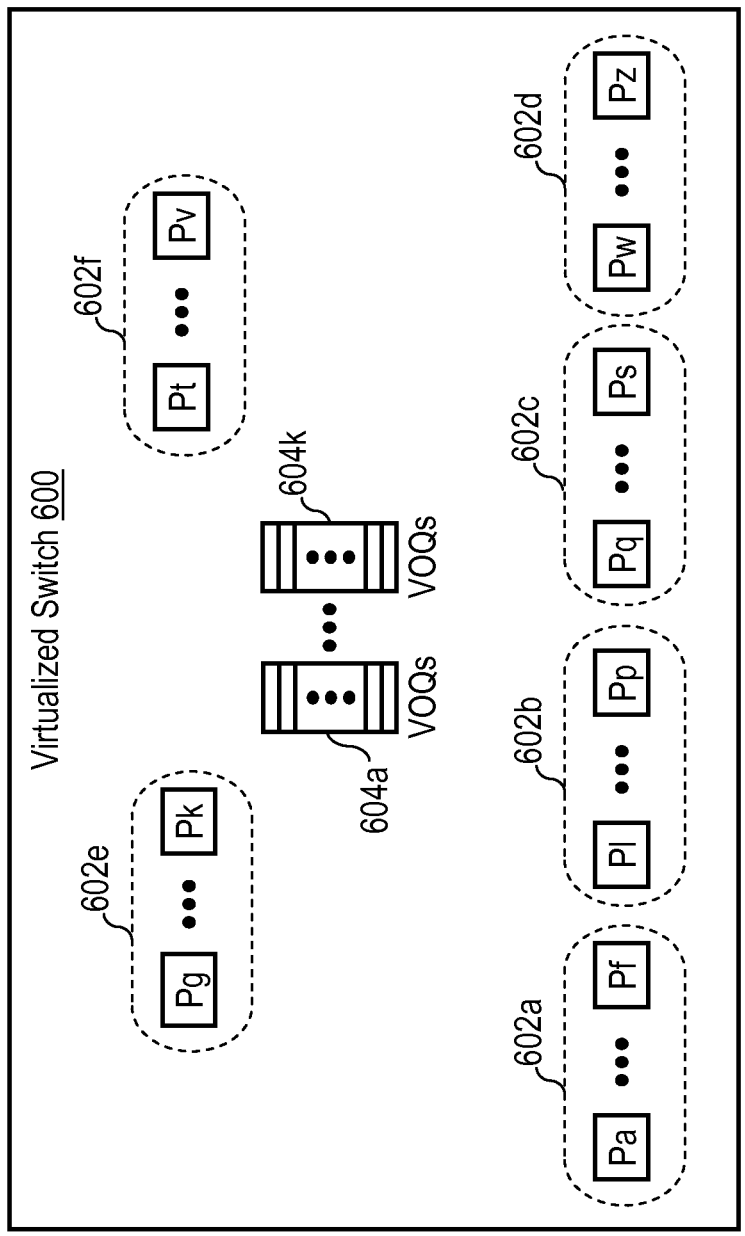
FIG. 6 is a view of the DFP switching network architecture of FIG. 2 or FIG. 3 presented as a virtualized switch via a management interface in accordance with one embodiment.

Management module 550 preferably includes a management interface 552, for example, an XML or HTML interface accessible to an administrator stationed at a network-connected administrator console (e.g., one of clients 110a-110c) in response to login and entry of administrative credentials. Management module 550 preferably presents via management interface 552 a global view of all ports residing on all switches (e.g., switches 204 and/or 202) in a DFP switching network 200 or 300. For example, FIG. 6 is a view of DFP switching network 200 of FIG. 2 presented as a virtualized switch 600 via management interface 552 in accordance with one embodiment. In this embodiment, master switch 204 can be considered a virtual switching chassis, with the follower switches 202 serving a virtual line cards. In this example, virtualized switch 600, which can be, for example, graphically and/or tabularly represented in a display of the administrator console, presents virtualized ports (Pa-Pf) 602a corresponding to the data ports and inter-switch ports of follower switch 202a, Pl-Pp 602b corresponding to the data ports and inter-switch ports of follower switch 202b, Pq-Ps 602c corresponding to the data ports and inter-switch ports of follower switch 202c, and Pw-Pz 602d corresponding to the data ports and inter-switch ports of follower switch 202d. In addition, virtualized switch 600 represents by Pg-Pk 602e the inter-switch ports of master switch 204a, and represents by Pt-Pv 602f the inter-switch ports of master switch 204b.

Further, virtualized switch 600 represents each vport 522, 524 implemented on a master switch 204 with a respective set of virtual output queues (VOQs) 604. For example, each of vports 522, 524 implemented on master switches 204a, 204b is represented by a respective one of VOQ sets 604a-604k. By interacting with virtualized switch 600, the administrator can manage and establish (e.g., via graphical, textual, numeric and/or other inputs) desired control for one or more (or all) ports or vports of one or more (or all) of follower switches 202 and master switches 204 in DFP switching network 200 via a unified interface. It should be noted that the implementation of sets of VOQs 604a-604k within virtualized switch 600 in addition to virtualized ports Pa-Pf 602a, Pl-Pp 602b, Pq-Ps 602c and Pw-Pz 602d enables the implementation of individualized control for data traffic of each RPI (and of each traffic classification of the data traffic of the RPI) at either tier (or both tiers) of a DFP switching network 200 or 300. Thus, as discussed further below, an administrator can implement a desired control for a specific traffic classification of a particular data port 210 of follower switch 202a via interacting with virtualized port Pa of virtualized switch 600. Alternatively or additionally, the administrator can establish a desired control for that traffic classification for that data port 210 by interacting with a particular VOQ corresponding to that traffic classification on the VOQ set 604 representing the ingress vport 522 or egress vport 524 corresponding to the data port 210.

Returning to FIG. 5A, switch controller 530a further includes a control module 560a that can be utilized to implement desired control for data frames traversing a DFP switching network 200 or 300. Control module 560a includes a local policy module 562 that implements a desired suite of control policies for switch 500a at ingress and/or egress on a per-vport basis. Control module 560 may further include a local access control list (ACL) 564 that restricts ingress access to switch 500a on a per-vport basis. The managing master switch 204 may optionally further include a remote policy module 566 and remote ACL 568, which implement a desired suite of control policies and access control on one or more of follower switches 202 or virtual switches 310, 312 upon ingress and/or egress on a per-data port basis. The managing master switch 204 can advantageously push newly added or updated control information (e.g., a control policy or ACL) for another master switch 204, follower switch 202 or virtual switch 310, 312 to the target switch via a reserved management VLAN. Thus, ACLs, control policies and other control information for traffic passing through the virtualized switch can be enforced by master switches 204 at the vports 522, 524 of the master switches 204, by follower switches 202 at data ports 210, and/or at the virtual ports of virtual switches 310, 312.

The capability to globally implement policy and access control at one or more desired locations within a DFP switching network 200 or 300 facilitates a number of management features. For example, to achieve a desired load balancing among master switches 204, homogeneous or heterogeneous control policies can be implemented by follower switches 202 and/or virtual switches 310, 312, achieving a desired distribution of the data traffic passing to the master switch(es) 204 for switching and routing. In one particular implementation, the load distribution can be made in accordance with the various traffic types, with different communication protocols run on different master switches 204. Follower switches 202 and hosts 302 connected to master switches 204 can thus implement a desired load distribution by directing protocol data units (PDUs) of each of a plurality of diverse traffic types to the master switch 204 responsible for that protocol.

Although not explicitly illustrated in FIG. 5A, it should be appreciated that in at least some embodiments, switch controller 530a may, in addition to Layer 2 frame switching, additionally implement routing and other packet processing at Layer 3 (and above) as is known in the art. In such cases, switch controller 530a can include a routing information base (RIB) that associates routes with Layer 3 addresses.

Figure 5B:
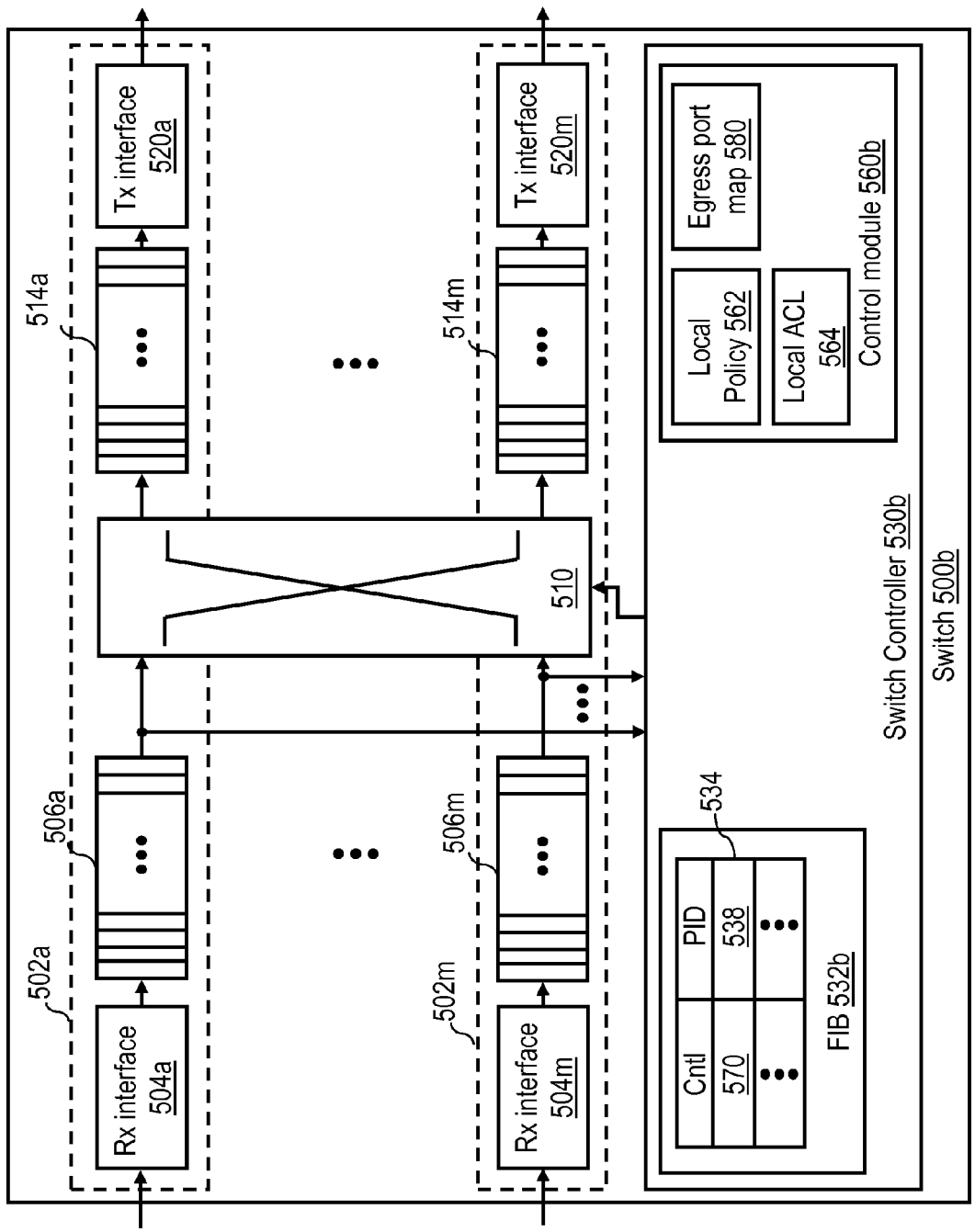
FIG. 5B is a high level block diagram of an exemplary embodiment of a follower switch of a DFP switching network in accordance with one embodiment.

Referring now to FIG. 5B, there is depicted a high level block diagram of an exemplary embodiment of a switch 500b, which may be utilized to implement any of the follower switches 202 of FIG. 2. As indicated by like reference numerals, switch 500b may be structured similarly to switch 500a, with a plurality of ports 502a-502m, a switch controller 530b, and a switch fabric 510 controlled by switch controller 530b. However, because switch 500b is intended to operate in a pass-through mode that leaves the ultimate responsibility for forwarding frames with master switches 204, switch controller 530b is simplified. For example, in the illustrated embodiment, each entry 534 of FIB 332b includes a control field 570 for identifying values for one or more frame fields (e.g., destination MAC address, RPI, etc.) utilized to classify the frames (where the frame classifications are pushed to switch controller 530b by management module 350) and an associated PID field 538 identifying the egress data port 502 of switch 530b that is connected to a master switch 204 for forwarding that classification of data traffic. Control module 560 is similarly simplified, as no remote policy 566 or remote ACLs 568 are supported. Finally, management module 550 can be entirely omitted, as switch 500b need not be equipped to serve as a master switch 204.

With reference now to FIG. 7, there is illustrated a high level logical flowchart of an exemplary process for managing a DFP switching network in accordance with one embodiment. For convenience, the process of FIG. 7 is described with reference to DFP switching networks 200 and 300 of FIGS. 2-3. As with the other logical flowcharts illustrated herein, steps are illustrated in logical rather than strictly chronological order, and at least some steps can be performed in a different order than illustrated or concurrently.

The process begins at block 700 and then proceeds to block 702, which depicts each of master switches 204a, 204b learning the membership and topology of the DFP switching network 200 or 300 in which it is located. In various embodiments, master switches 204a, 204b may learn the topology and membership of a DFP switching network 200 or 300, for example, by receiving a configuration from a network administrator stationed at one of client devices 110a-110c, or alternatively, through implementation of an automated switch discovery protocol by the switch controller 530a of each of master switches 204a, 204b. Based upon the discovered membership in a DFP switching network 200 or 300, the switch controller 530a of each of master switches 204 implements, on each port 502, a respective ingress vport 522 and a respective egress vport 524 for each RPI in the lower tier of the DFP switching network 200, 300 from which ingress data traffic can be received on that port 502 (block 704). The managing master switch 204, for example, master switch 204a, thereafter permits configuration, management and control of DFP switching network 200 or 300 as a virtualized switch 600 through management interface 552 (block 706). It should be appreciated that as a virtualized switch 600, DFP switching network 200 or 300 can be configured, managed and controlled to operate as if all the virtualized ports 602 of virtualized switch 600 were within a single physical switch. Thus, for example, port mirroring, port trunking, multicasting, enhanced transmission selection (ETS) (e.g., rate limiting and shaping in accordance with draft standard IEEE 802.1 Qaz), and priority based flow control can be implemented for virtualized ports 602 regardless of the switches 202, 310, 312 or hosts 302 to which the corresponding RPIs belong.

Thereafter, the management module 550 of the switch controller 530a of the managing master switch (e.g., master switch 204a) pushes control information to other master switches 204, follower switches 202 and/or virtual switches 310, 312 in order to property configure the control module 560 and FIB 532 of the other switches (block 708). The process of FIG. 7 thereafter ends at block 710.

Referring now to FIG. 8, there is depicted a high level logical flowchart of an exemplary process by which network traffic is forwarded from a lower tier to an upper tier of a DFP switching network configured to operate as a virtualized switch in accordance with one embodiment. For convenience, the process of FIG. 8 is also described with reference to DFP switching network 200 of FIG. 2 and DFP switching network 300 of FIG. 3.

The depicted process begins at block 800 and thereafter proceeds to block 802, which depicts an RPI at the lower tier of the DFP switching network receiving a data frame to be transmitted to a master switch 204. As indicated by dashed line illustration at block 804, the follower switch 202 or host 302 at which the RPI is located may optionally enforce policy control or access control (by reference to an ACL) to the data frame, if previously instructed to do so by the managing master switch 204.

At block 806, the follower switch 202 or host 302 at the lower tier applies an RPI identifier (e.g., an S-tag) to the data frame to identify the ingress RPI at which the data frame was received. The follower switch 202 or host 302 at the lower tier then forwards the data frame to a master switch 204 in the upper tier of the DFP switching network 200 or 300 (block 808). In the case of a follower switch 202, the data frame is forwarded at block 808 via the inter-switch egress port indicated by the FIB 532b. Thereafter, the process depicted in FIG. 8 ends at block 810.

Figure 9:
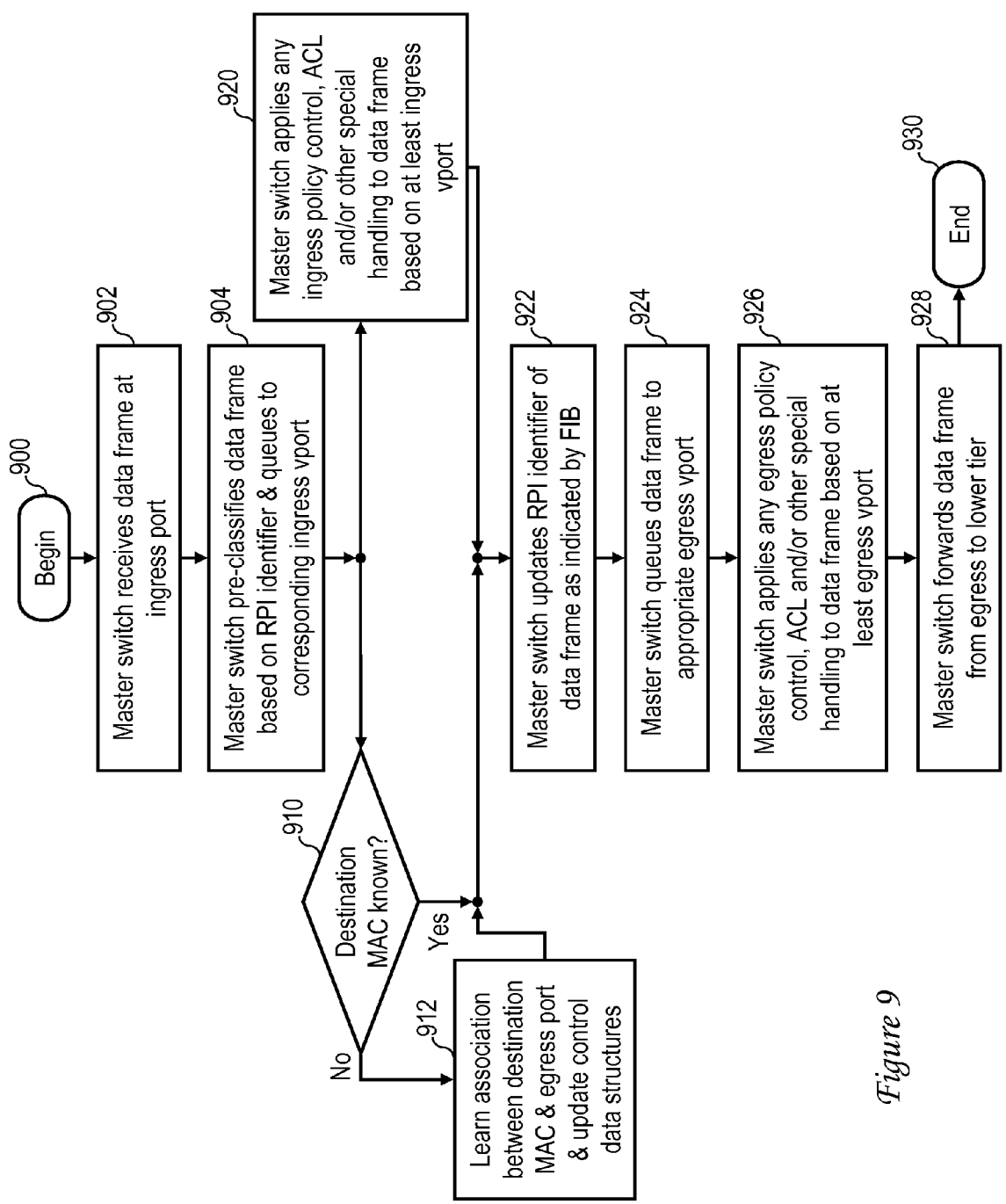
FIG. 9 is a high level logical flowchart of an exemplary process by which a master switch at the upper tier handles a data frame received from the lower tier of a DFP switching network in accordance with one embodiment.

With reference to FIG. 9, there is illustrated a high level logical flowchart of an exemplary process by which a master switch at the upper tier handles a data frame received from the lower tier of a DFP switching network in accordance with one embodiment. The illustrated process begins at block 900 and then proceeds to block 902, which depicts a master switch 204 of a DFP switching network 200 or 300 receiving a data frame from a follower switch 202 or host 302 on one of its ports 502. In response to receipt of the data frame, the receive interface 504 of the port 502 at which the data frame was received pre-classifies the data frame according to the RPI identifier (e.g., S-tag) specified by the data frame and queues the data frame to the ingress vport 522 associated with that RPI (block 904). From block 904, the process depicted in FIG. 9 proceeds to both of blocks 910 and 920.

At block 910, switch controller 530a accesses FIB 532a utilizing the destination MAC address specified by the data frame. If a FIB entry 534 having a matching MAC field 536 is located, processing continues at blocks 922-928, which are described below. If, however, switch controller 530a determines at block 910 that the destination MAC address is unknown, switch controller 530a learns the association between the destination MAC address, egress port 502 and destination RPI utilizing a conventional discovery technique and updates FIB 532a accordingly. The process then proceeds to blocks 922-928.

At block 920, switch controller 530a applies to the data frame any local policy 562 or local ACL 564 specified for the ingress vport 522 by control module 560a. In addition, switch controller 530a performs any other special handling on ingress for the data frame. As discussed in greater detail below, this special handling can include, for example, the implementation of port trunking, priority based flow control, multicasting, port mirroring or ETS. Each type of special handling can be applied to data traffic at ingress and/or at egress, as described further below. The process then proceeds to blocks 922-928.

Referring now to blocks 922-924, switch controller 530a updates the RPI identifier of the data frame to equal that specified in the VPID field 540 of the matching FIB entry 534 (or learned by the discovery process) and queues the data frame in the corresponding egress vport 524 identified by the PID field 538 of the matching FIB entry 534 (or learned by the discovery process). At block 926, switch controller 530a applies to the data frame any local policy 562 or local ACL 564 specified for the egress vport 524 by control module 560a. In addition, switch controller 530a performs any other special handling on egress for the data frame, including, for example, the implementation of port trunking, priority based flow control, multicasting, port mirroring or ETS. Master switch 204 thereafter forwards the data frame via an inter-switch link 206 to the lower tier (e.g., a follower switch 202 or host 302) of the DFP switching network 200 or 300 (block 928). The process shown in FIG. 9 thereafter terminates at block 930.

Figure 10:
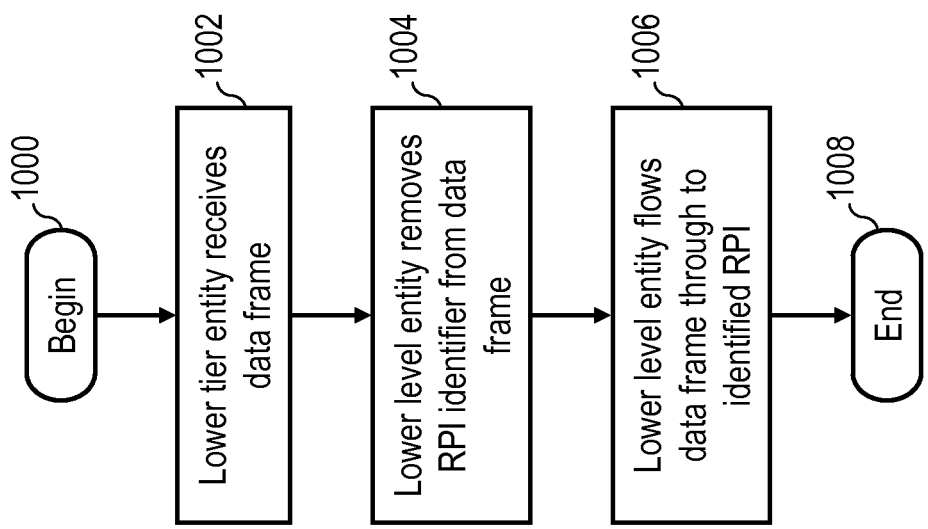
FIG. 10 is a high level logical flowchart of an exemplary process by which a follower switch or host at the lower tier handles a data frame received from a master switch at the upper tier of a DFP switching network in accordance with one embodiment.

Referring now to FIG. 10, there is depicted a high level logical flowchart of an exemplary process by which a follower switch 202 or host 302 at the lower tier handles a data frame received from a master switch at the upper tier of a DFP switching network 200 or 300 in accordance with one embodiment. The process depicted in FIG. 10 begins at block 1000 and then proceeds to block 1002, which illustrates a lower tier entity, such as a follower switch 202 or a host 302, receiving a data frame from a master switch 204, for example, at an inter-switch port 502 of the follower switch 202 or at a network interface 404 or VMM 304 of the host 302.

In response to receipt of the data frame, the lower level entity removes from the data frame the RPI identifier updated by the master switch 204 (block 1004). The lower level entity then flows through the data frame to the RPI identified by the extracted RPI identifier (block 1006). Thus, for example, switch controller 530b accesses its FIB 532b with the RPI and/or destination MAC address of the data frame to identify a matching FIB entry 534 and then controls switch fabric 510 to forward the data frame to the port specified in the PID field 538 of the matching FIB entry 534. A network interface 404 or VMM 304 of a host similarly directs the data frame the RPI indicated by the RPI identifier. Thereafter, the process ends at block 1008.

In a DFP switching network having a plurality of master switches 204 in the upper tier and a plurality of lower tier entities (e.g., follower switches 202 or hosts 302), it is desirable to avoid single points of failure. Consequently, in at least some embodiments, each lower tier entity is coupled to each of multiple of the master switches 204 by a respective one of multiple inter-switch link 206, as shown in FIGS. 2-3. In such embodiments, data traffic flowing from the lower tier entities to master switches 204 is preferably distributed over the inter-switch links 206 to achieve a desired load balancing between master switches 204. If communication over one of inter-switch links 206 is interrupted by the link going down, the distribution is preferably updated to achieve an updated load balanced traffic distribution.

Figure 11:
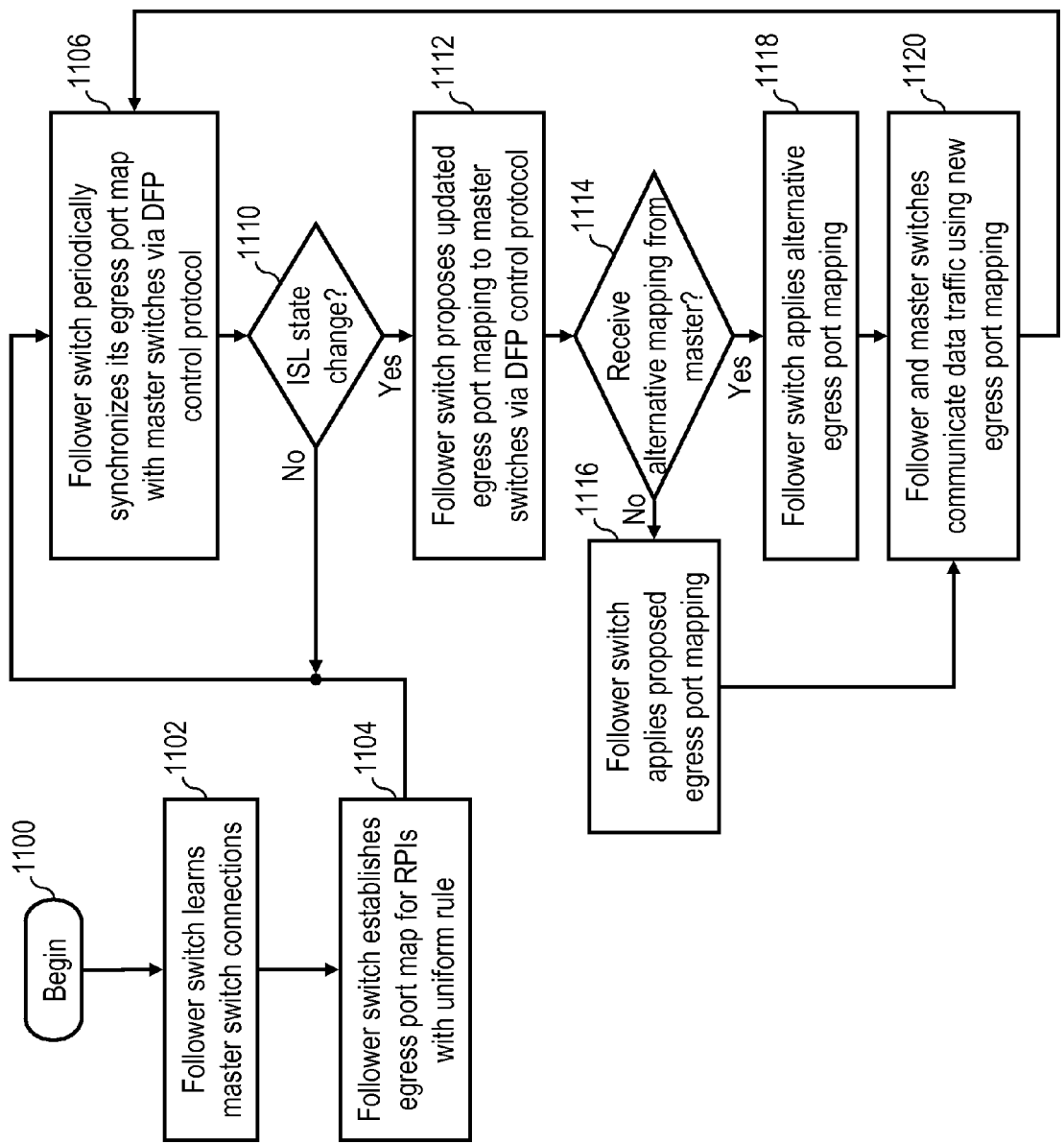
FIG. 11 is a high level logical flowchart of an exemplary method of implementing a high availability mechanism in a DFP switching network in accordance with one embodiment.

With reference now to FIG. 11, there is illustrated a high level logical flowchart of an exemplary method of implementing a high availability mechanism in lower tier entity of a DFP switching network in accordance with one embodiment. The process begins at block 1100 and then proceeds to block 1102, which depicts a lower tier entity (e.g., a follower switch 202 or host 302, and hereafter assumed to be a follower switch 202) learning its connections to master switches 204 of a DFP switching network. The follower switch 202 can learn its connections to master switches 204, for example, utilizing a network discovery protocol or by receiving the connection information from a master switch 204 (e.g., in conjunction with the other control information received at block 708). Next, at block 1104, the follower switch 202 establishes an egress port map 580 (FIG. 5B) that indicates to which inter-switch link 206 data traffic of each RPI of the follower switch 202 will be forwarded. As indicated, in order to balance data traffic of lower tier entities across master switches 204, the egress port map 580 is preferably constructed utilizing a uniform rule applied by all lower tier entities.

For example, in the static configuration embodiment described above, egress port map 580 distributes data traffic among the inter-switch links 206 based on the source RPIs. In this exemplary embodiment, if each lower tier entity is coupled to two master switches 204, each follower switch 202 or host 302 is configured to implement an egress port map 580 defining two static RPI groups each containing half of the total number of its RPIs and then to transmit data traffic of each of the RPI groups via a respective inter-switch link 206 to a different one of the two master switches 204. Similarly, if each lower tier entity is coupled by inter-switch links 206 to four master switches 204, each follower switch 202 or host 302 is configured to implement an egress port map 580 defining four static RPI groups each containing one-fourth of the total number of its RPIs and then transmit traffic of each of the RPI groups to a different one of the four master switches 204. Of course, in other embodiments, other rules can be utilized to statically or dynamically balance data traffic across master switches 204 and thus to generate egress port maps 580. As indicated at block 1106, follower switch 202 may optionally periodically synchronize its egress port map 580 with master switches 204, for example, via an exchange of DFP control protocol frames. In the exchange, master switches 204 may instruct one or more lower tier entities to modify their egress port maps 580, for example, in order to a better balance of data traffic.

At block 1110, follower switch 202 detects whether an inter-switch link 206 by which it communicates data traffic with a master switch 204 has changed state (e.g., changed from a link up state to a link down state or vice versa). If no link state change is detected at block 1110, the process returns to block 1106, which has been described. If, however, follower switch 202 detects a state change of an inter-switch link 206 at block 1110, the process proceeds to block 1112. Block 1112 depicts the follower switch 202 proposing an updated egress port map 580 to the master switches 204 to which it remains connected via inter-switch links 206 utilizing a DFP control protocol frame. For example, if the static port-based load balancing technique discussed above is employed and the follower switch 202 detects failure of one of four inter-switch links 206, follower switch 202 may propose an updated egress port map 580 that defines three static RPI groups each containing one-third of the total number of its RPIs, where data traffic of each of the three RPI groups will egress on a respective one of the three active inter-switch links 206. Alternatively, if follower switch 202 detects restoration of one of its four inter-switch links 206 with master switches 204, follower switch 202 may propose return to the initial egress port map 580 defining four static RPI groups. At block 1114, follower switch 202 determines whether a master switch 204 has proposed an alternative egress port mapping, for example, in a DFP control data frame responding to the egress port mapping proposed by the follower switch 202.

As indicated at blocks 1114, 1116 and 1118, if a master switch 204 does not specify an alternative egress port mapping, follower switch 202 applies its proposed egress port mapping in egress port map 580 and otherwise applies the alternative egress port mapping specified by follower switch 202. Thereafter, follower switch 202 and master switches 204 dynamically apply the new egress port mapping indicated in the updated egress port map 580 to live data traffic streams (block 1120). The dynamic application of the new egress port mapping in this manner is enabled at master switches 204 by the prior configuration at block 704 of FIG. 7 of an ingress vport 522 on each master switch 204 for each RPI of each lower tier entity to which the master switch 204 is connected by an inter-switch link. In master switches 204 to which egress data traffic is not initially mapped, such ingress vports 522 are initially disabled and are then dynamically enabled, as needed, when data traffic is redistributed. Because the minimal reconfiguration required to handle a link down event, the redirection of data can be accomplished without dropping data packets. Following block 1120, the process returns to block 1106, which has been described.

As will be appreciated, an update to the egress port map 580 of one lower tier entity may cause one or more master switches 204 to initiate a modification of the egress port map(s) 580 of one or more additional lower tier entities, for example, during a synchronization cycle as depicted at block 1106.

As has been described, in some embodiments, a switching network includes an upper tier including a master switch and a lower tier including a plurality of lower tier entities. The master switch includes a plurality of ports each coupled to a respective one of the plurality of lower tier entities. Each of the plurality of ports includes a plurality of virtual ports each corresponding to a respective one of a plurality of remote physical interfaces (RPIs) at the lower tier entity coupled to that port. Each of the plurality of ports also includes a receive interface that, responsive to receipt of data traffic from a particular lower tier entity among the plurality of lower tier entities, queues the data traffic to the virtual port among the plurality of virtual ports that corresponds to the RPI on the particular lower tier entity that was the source of the data traffic. The master switch further includes a switch controller that switches data traffic from the virtual port to an egress port among the plurality of ports from which the data traffic is forwarded.

In at least some embodiment of a switching network, each of a plurality of lower tier entities is coupled to each of multiple master switches at an upper tier by a respective one of multiple links. At each of the multiple master switches, a plurality of virtual ports each corresponding to a respective one of a plurality of remote physical interfaces (RPIs) at the lower tier are implemented on each of a plurality of ports. Each of the plurality of lower tier entities implements a respective egress port mapping indicating which of its plurality of RPIs transmits egress data traffic through each of its multiple links to the multiple master switches. In response to failure of one of the multiple links coupling a particular lower tier entity to a particular master switch, the particular lower tier entity updates its egress port mapping to redirect egress data traffic to another of the multiple master switches.

While the present invention has been particularly shown as described with reference to one or more preferred embodiments, it will be understood by those skilled in the art that various changes in form and detail may be made therein without departing from the spirit and scope of the invention. For example, although aspects have been described with respect to one or more machines (e.g., hosts and/or network switches) executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions.

What is claimed is:

1. A method of operating a physical switching network including an upper tier having multiple physical master switches and a lower tier including a plurality of physical lower tier follower switches, the method comprising:
   coupling inter-switch ports of each of the lower tier follower switches to each of multiple physical master switches at the upper tier by a respective one of multiple links and configuring each of the lower tier follower switches in flow through mode;
   at each of the multiple master switches, implementing on each of a plurality of master switch ports a plurality of virtual ports each corresponding to a respective one of a plurality of data ports at the lower tier follower switch coupled to that master switch port, wherein the plurality of data ports provide physical interfaces for data traffic ingressing and egressing the switching network;
   each of the plurality of lower tier follower switches maintaining a respective egress port mapping indicating which of its plurality of data ports transmits egress data traffic through each of its inter-switch ports to the multiple master switches; and
   in response to failure of one of the multiple links coupling a particular lower tier follower switch among the plurality of lower tier follower switches to a particular master switch among the multiple master switches, the particular lower tier follower switch updating its egress port mapping to redirect egress data traffic from the particular master switch to at least one other of the multiple master switches.

2. The method of claim 1, wherein:
   each of the pluralities of virtual ports comprises a plurality of ingress virtual ports.

3. The method of claim 1, wherein:
   the egress data traffic includes data port identifiers identifying source data ports of the egress data traffic on the particular lower tier follower switch;
   the multiple master switches queuing the data traffic to virtual ports based on the data port identifiers.

4. The method of claim 1, wherein:
   the implementing includes implementing redundant virtual ports for each data port of the lower tier follower switches at multiple master switches.

5. The method of claim 4, wherein:
   the particular master switch is a first master switch;
   the method further comprises:
      initially disabling a virtual port on a second master switch corresponding to a particular data port on the particular lower tier entity; and
      dynamically enabling the virtual port in response to the updating.

6. The method of claim 1, wherein:
   maintaining a respective egress port mapping comprises defining multiple data port groups on each lower tier follower switch equal in number to a number of the multiple master switches; and
   egress data traffic of data ports in each data port group is transmitted to a respective one of the multiple master switches.

* * * * *